United States Patent
Inada et al.

(10) Patent No.: US 12,486,548 B2
(45) Date of Patent: Dec. 2, 2025

(54) METHOD FOR PRODUCING REDUCED IRON

(71) Applicant: NIPPON STEEL CORPORATION, Tokyo (JP)

(72) Inventors: Takanobu Inada, Tokyo (JP); Moritoshi Mizutani, Tokyo (JP); Yutaka Ujisawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 477 days.

(21) Appl. No.: 17/921,654

(22) PCT Filed: May 13, 2021

(86) PCT No.: PCT/JP2021/018156
§ 371 (c)(1),
(2) Date: Oct. 27, 2022

(87) PCT Pub. No.: WO2021/230307
PCT Pub. Date: Nov. 18, 2021

(65) Prior Publication Data
US 2023/0167516 A1  Jun. 1, 2023

(30) Foreign Application Priority Data
May 14, 2020  (JP) .................................. 2020-085078

(51) Int. Cl.
*C21B 13/00* (2006.01)
*C21B 13/02* (2006.01)

(52) U.S. Cl.
CPC .......... *C21B 13/0073* (2013.01); *C21B 13/02* (2013.01); *C21B 2100/28* (2017.05); *C21B 2100/40* (2017.05); *C21B 2100/64* (2017.05)

(58) Field of Classification Search
CPC . C21B 13/0073; C21B 13/02; C21B 2100/28; C21B 2100/40; C21B 2100/64;
(Continued)

(56) References Cited

U.S. PATENT DOCUMENTS 2,609,288 A    9/1952  Stuart
2,862,808 A †  12/1958 De Jahn
(Continued)

FOREIGN PATENT DOCUMENTS

CA    3 103 187 A1    12/2019
EP    0018235 A1      10/1980
(Continued)

OTHER PUBLICATIONS

2. Ichikawa Hiroshi, et.al. JP2015227496A] (machine translation) (Year: 2015).*
(Continued)

*Primary Examiner* — Sally A Merkling
*Assistant Examiner* — Nazmun Nahar Shams
(74) *Attorney, Agent, or Firm* — Myers Wolin, LLC

(57) ABSTRACT

A method for producing reduced iron that produces reduced iron by reducing iron oxide charged in a shaft furnace, in which a gas mixture which contains a reducing gas and a nitrogen gas, and has a predetermined temperature, is blown into the shaft furnace. The reducing gas contains 90 volume % or more of a hydrogen gas.

14 Claims, 11 Drawing Sheets

(58) Field of Classification Search
CPC ............ C21B 2100/22; C21B 2100/26; C21B 2100/44; C21B 2100/04
USPC .......................................................... 75/490
See application file for complete search history.

(56) References Cited

U.S. PATENT DOCUMENTS

| | | | |
|---|---|---|---|
| 3,135,598 A | | 6/1964 | Mizushima |
| 4,363,654 A | * | 12/1982 | Frederick ................. C01B 3/36 75/496 |
| 6,027,545 A | † | 2/2000 | Villarreal-Trevino |
| 12,180,554 B2 | * | 12/2024 | Boehm ............... C21B 13/0093 |

FOREIGN PATENT DOCUMENTS

| | | |
|---|---|---|
| JP | S55-144402 A | 11/1980 |
| JP | 12016-529383 A | 9/2016 |
| WO | WO-2015016950 A1 * | 2/2015 ............... C01B 3/36 |

OTHER PUBLICATIONS

Direct From Midrex 3RD Quarter 2017, Midrex Technologies Inc., USA, 2017 (https://www.midrex.com/dfm-newsletter/3q-2017-direct-from-midrex/).

Wang et al., "Simulation analysis on hydrogen reduction shaft furnace", Journal of Chongqing University, pp. 57-66, vol. 39, No. 4, Aug. 2016, China, with English abstract.

"Direct from Midrex" by Midrex Technologies, Inc., published 3rd Quarter 2017 ("Attachment D1").†

"MidrexH2TM: Ultra Low CO2 Ironmaking in the transition to the Hydrogen Economy" by Vincent Chevier, Ph.D., of Midrex Technologies, Inc., published Jun. 27, 2019; with Conference Program of "METEC &4th ESTAD 2019" Steel Institute VDEh, Jun. 24-28, 2019 and confirmatory email from conference organizer ("Attachment D2") (with partial English translation).†

\* cited by examiner
† cited by third party

METHOD FOR PRODUCING REDUCED IRON

CROSS-REFERENCE TO RELATED APPLICATION

This application is a National Phase under 35 U.S.C. 371 of PCT/JP2021/018156, filed on May 13, 2021, and which designated the U.S., which claims priority to Japanese Patent Application No. 2020-085078, filed on May 14, 2020. The contents of each are wholly incorporated herein by reference.

TECHNICAL FIELD

The present disclosure relates to a method for producing reduced iron.

Priority is claimed on Japanese Patent Application No. 2020-85078, filed May 14, 2020, the content of which is incorporated herein by reference.

BACKGROUND ART

A method for producing reduced iron using a shaft furnace (shaft furnace operation) is a representative of a direct reduction process that produces reduced iron from an iron oxide raw material and is becoming widespread in districts where, mainly, natural gas can be procured at a low cost (oil-producing countries). Here, the concept of a conventional shaft furnace operation will be described based on FIG. 14. In the example of FIG. 14, an iron oxide raw material (for example, iron oxide pellets) 200 is charged from the top of the shaft furnace 100, and a reducing gas 300 is blown from the bottom of the shaft furnace 100. The reducing gas is heated up to a predetermined temperature (for example, approximately 900° C. to 950° C.) and then blown into the shaft furnace 100. Then, the reducing gas 300 blown into the shaft furnace 100 reduces the iron oxide raw material 200 in the shaft furnace. Reduced iron 210 is produced by means of such a direct reduction process. The reduced iron 210 is discharged from the bottom of the shaft furnace 100, and then cooled. A furnace top gas 400 containing a hydrogen gas, a CO gas, water vapor and a $CO_2$ gas is exhausted from the furnace top of the shaft furnace 100.

The reducing gas 300 that is used in the shaft furnace 100 is obtained by reforming a raw material gas containing a carbon component (for example, natural gas, coke oven gas or the like) 310 by use of water vapor, oxygen or the like, and main components are hydrogen gas ($H_2$) 300a and CO gas (CO) 300b.

CITATION LIST

Non Patent Document

[Non Patent Document 1]
"DIRECT FROM MIDREX 3RD QUARTER 2017" (https://www.midrex.com/dfm-newsletter/3q-2017-direct-from-midrex/)

SUMMARY

Problems to be Solved

In the conventional shaft furnace operation, the $H_2$/CO volume ratio of the reducing gas is within a range of approximately 1.5 to 4.0. Therefore, the shaft furnace operation is considered as a superior iron and steel manufacturing process to the blast furnace-converter method from the viewpoint of $CO_2$ emission reduction although the shaft furnace operation is a conventional operation. However, in order to pursue iron and steel manufacturing with $CO_2$ zero emission, which will be forced in the future, an additional increase in the volume proportion of a hydrogen gas in the reducing gas is required.

Thus far, a variety of technologies regarding the shaft furnace operation have been proposed; however, in almost all of the technologies, natural gas, coke oven gas and the like containing a carbon component have been used as a raw material gas that serves as a raw material for reducing gases. However, in recent years, a reduced iron maker proposing a process in which natural gas, which is a main raw material gas of reducing gases, is substituted by a hydrogen gas (that is, an operation in which a reducing gas containing a high concentration, almost 100 volume %, of a hydrogen gas is used) has appeared with emphasis on $CO_2$ zero emission (refer to Non Patent Document 1).

The operation using a reducing gas containing a high concentration of a hydrogen gas is possible in stoichiometric consideration based on heat and mass balance but it cannot be said that this operation does not cause any practical problems. Therefore, the present inventors studied whether or not the operation using a reducing gas containing a hydrogen gas can be achieved with no practical problems as an extension of the conventional shaft furnace operation. As a result, a technical problem to be solved was found. The details will be described below, but it has been clarified that, simply when a reducing gas containing a high concentration of a hydrogen gas is used in the conventional shaft furnace operation, a large amount of the hydrogen gas is exhausted from the furnace top without being used for reduction, which creates a problem of an excessive increase in the reducing gas intensity (the in-furnace blowing amount of a reducing gas, a hydrogen gas in this case, necessary to produce one ton of reduced iron). Such a problem is not taken into any consideration in Non-Patent Document 1.

The present disclosure has been made in consideration of the above-described problems, and an objective of the present disclosure is to provide a new and improved method for producing reduced iron capable of decreasing the reducing gas intensity even in the case of using a reducing gas containing a high concentration of a hydrogen gas.

Means for Solving the Problem

The present inventors studied whether or not the operation in which a reducing gas containing a hydrogen gas is used can be achieved with no practical problems as an extension of the conventional shaft furnace operation. As a studying method, simulation in which the mathematical model of a shaft furnace was used was carried out. The model was built based on the chemical engineering methods described in non-patent Document (for example, Hara et al.: Tetsu-to-Hagane, Vol. 62 (1976), Issue 3, p. 315 and Yamaoka et al., Tetsu-to-Hagane, Vol. 74 (1988), Issue 12, p. 2254) and enables the theoretical analysis and estimation of heat and mass transfer in shaft furnaces such as a chemical reaction, including a reduction reaction of iron oxide by a reducing gas, and a heat transfer phenomenon. A shaft furnace operation in which a reducing gas containing a high concentration of a hydrogen gas was used was simulated using the present mathematical model, and macroscopic heat and mass transfer was evaluated.

Table 1 shows prerequisites (calculation conditions) provided for case studies. The present calculation conditions were set based on typical operation conditions so that the generality of results was not impaired in view of the purpose of evaluating the macroscopic heat and mass transfer. In addition, a space corresponding to the reducing reaction zone in the shaft surface was set as the target of the calculation in the mathematical model.

TABLE 1

| Height of reducing reaction zone | 5 m | Iron oxide pellets TFe | 66 mass % |
| Inner diameter of reducing reaction zone | 6 m | Iron oxide pellets particle diameter | 10.5 mm |
| Furnace wall heat dissipation | none | | |

FIG. 10 is a graph showing the minimum amount of heat necessary to produce one ton of reduced iron (reduction degree: 100%) using a reducing gas (900° C.) (hereinafter, also referred to as "heat amount intensity") (MJ/t-Fe) for each $H_2/CO$ volume ratio of the reducing gas. In the present specification, "/t-Fe" indicates "value per ton of reduced iron (reduction degree: 100%)". In FIG. 10, "Sensible heat taken out by finished product DRI" is sensible heat that is taken out by reduced iron, which is a finished product, to the outside of the furnace, "sensible heat taken out by furnace top gas" is sensible heat that is taken out by the furnace top gas to the outside of the furnace and "reduction reaction heat" is heat necessary for the reduction reaction of the reducing gas. As is clear from FIG. 10, the heat amount intensity increases as the $H_2/CO$ volume ratio of the reducing gas increases. The $H_2/CO$ volume ratios 80/20 to 66/33 correspond to the compositions of representative reducing gases for the conventional shaft furnace operation. In addition, FIG. 11 is a graph showing the minimum amount of the reducing gas necessary to produce one ton of reduced iron (reduction degree: 100%) using a reducing gas (900° C.) (that is, the reducing gas intensity) ($Nm^3$/t-Fe) for each $H_2/CO$ volume ratio of the reducing gas. As is clear from FIG. 11, the reducing gas intensity increases as the $H_2/CO$ volume ratio of the reducing gas increases.

The reason for obtaining the results as in FIG. 10 and FIG. 11 is that, as shown by the following formula (1) and formula (2), the reduction reaction by a hydrogen gas becomes an endothermic reaction as opposed to the reduction reaction by a CO gas being an exothermic reaction.

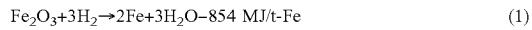

$$Fe_2O_3 + 3H_2 \rightarrow 2Fe + 3H_2O - 854 \text{ MJ/t-Fe} \quad (1)$$

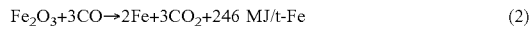

$$Fe_2O_3 + 3CO \rightarrow 2Fe + 3CO_2 + 246 \text{ MJ/t-Fe} \quad (2)$$

That is, as the volume proportion of the hydrogen gas in the reducing gas increases, the amount of heat input to cover the reduction reaction heat by the hydrogen gas (reduction reaction heat) increases. In addition, in a case where the blow temperature of the reducing gas is not changed, as shown in FIG. 11, the reducing gas intensity needs to increase.

Attention should be paid to the deterioration of the utilization ratio of the reducing gas attributed to the increase in the reducing gas intensity. The utilization ratios of the reducing gas, which are calculate from the composition of the furnace top gas, are shown in FIG. 12. FIG. 12 is a graph showing the utilization ratio (%) of the reducing gas for each $H_2/CO$ volume ratio of the reducing gas. The utilization ratio of the reducing gas can be obtained by dividing the total volume of water vapor and the $CO_2$ gas that are contained in the furnace top gas by the total volume of the hydrogen gas, water vapor, the CO gas and the $CO_2$ gas that are contained in the furnace top gas. Since the amount of the reduction reaction necessary to produce one ton of reduced iron (reduction degree: 100%) (in other words, the deoxidation amount) is the same, an increase in the reducing gas intensity increases the reducing gas that is not involved in the reduction reaction, and the reducing gas, that is, the hydrogen gas is wasted for heat supply. That is, as the volume proportion of the hydrogen gas in the reducing gas increases, it is necessary to supply a larger amount of the hydrogen gas into the shaft furnace as a heat supply source in order to cover the reduction reaction heat by the hydrogen gas. Furthermore, as a result of a large amount of the hydrogen gas being blown into the shaft furnace, a majority of the hydrogen gas does not react in the shaft furnace and is exhausted as the furnace top gas. Therefore, the utilization ratio of the reducing gas decreases. As described above, simply when a reducing gas containing a high concentration of a hydrogen gas is used in the conventional shaft furnace operation, a large amount of the hydrogen gas is wasted without being used for reduction, which creates a technical problem of an excessive increase in the hydrogen gas intensity.

Incidentally, theoretically, it is also possible to cover the reduction reaction heat by the hydrogen gas by raising the blow temperature of the reducing gas. FIG. 13 is a graph showing the relationship between the reducing gas intensity ($Nm^3$/t-Fe) and the blow temperature (° C.) of the reducing gas for each $H_2/CO$ volume ratio of the reducing gas. As shown in FIG. 13, in the case of using a reducing gas containing a high concentration, 90 volume % or more, of a hydrogen gas, in order to carry out operation with approximately the same reducing gas intensity as that for the conventional shaft furnace operation, it is necessary to significantly raise the blow temperature relative to that for the conventional shaft furnace operation by at least 100° C. or more (200° C. or more when the $H_2/CO$ volume ratio is 100/0), which is roughly estimated. However, in a case where the blow temperature of a reducing gas containing a high concentration of a hydrogen gas is significantly raised, there is a concern of the occurrence of a so-called sticking phenomenon in which reduced iron particles in the furnace adhere to each other. Furthermore, as the high-temperature hydrogen gas is handled, facility cost will increase in order to secure the safety operation and to cope with hydrogen embrittlement.

In summary, in the case of carrying out shaft furnace operation using a reducing gas containing a high concentration of a hydrogen gas, a fundamental problem is how to cover the reduction reaction heat by the hydrogen gas. As a method for solving such a fundamental problem, the present inventors considered the blowing of a nitrogen gas, which does not affect the reduction reaction in the shaft furnace, into the shaft furnace together with the reducing gas. In addition, the present inventors caused the nitrogen gas to cover at least part of heat necessary for the reduction reaction by the hydrogen gas. As a result, it was possible to reduce the reducing gas intensity and also to drop the blow temperature of the reducing gas. The present disclosure has been made based on these findings.

That is, according to a certain viewpoint of the present disclosure, provided is a method for producing reduced iron that produces reduced iron by reducing iron oxide charged in a shaft furnace, wherein a heated gas mixture containing a reducing gas and a nitrogen gas is blown into the shaft furnace, the reducing gas containing 90 volume % or more of a hydrogen gas.

According to another viewpoint of the present disclosure, provided is a method for producing reduced iron that produces reduced iron by reducing iron oxide charged in a shaft furnace, the method including: heating a gas mixture containing a reducing gas and a nitrogen gas, the reducing gas containing 90 volume % or more of a hydrogen gas, and blowing the heated gas mixture into the shaft furnace.

The method may include separating and collecting at least unreacted hydrogen gas and nitrogen gas from a furnace top gas of the shaft furnace and reusing the separated and collected hydrogen gas and nitrogen gas as part of the gas mixture.

Further, part of the separated and collected hydrogen gas and nitrogen gas may be used as a fuel gas at the time of heating the gas mixture.

According to another viewpoint of the present disclosure, provided is a method for producing reduced iron that produces reduced iron by reducing iron oxide charged in a shaft furnace, the method including: separately heating a reducing gas and a nitrogen gas, the reducing gas containing 90 volume % or more of a hydrogen gas, mixing the heated reducing gas and the heated nitrogen gas to prepare a gas mixture, and blowing the gas mixture into the shaft furnace.

A heating temperature of the nitrogen gas may be higher than a heating temperature of the reducing gas.

Further, the method may include separating and collecting at least unreacted hydrogen gas and nitrogen gas from a furnace top gas of the shaft furnace; and reusing the separated and collected hydrogen gas and nitrogen gas as the reducing gas and the nitrogen gas to be heated.

Further, in the gas mixture, a proportion of the nitrogen gas may be 90 volume % or less of the hydrogen gas.

Further, at the time of blowing the gas mixture into the shaft furnace, a temperature of the gas mixture may be 900° C. or lower.

Effects

According to the above-described viewpoints of the present disclosure, it is possible to reduce the reducing gas intensity even in the case of using a reducing gas containing a high concentration of a hydrogen gas.

DETAILED DESCRIPTION

Figure 1:
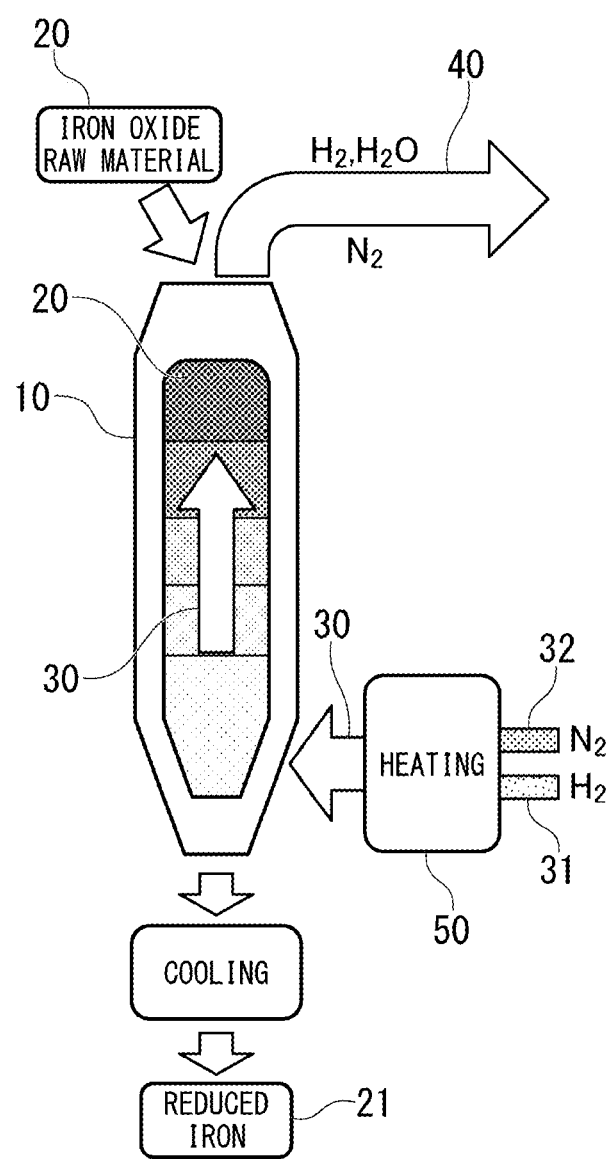
FIG. 1 is an explanatory view showing the process flow of a method for producing reduced iron according to a first embodiment.

Hereinafter, preferable embodiments of the present disclosure will be described in detail with reference to the accompanying drawings. Numerical limiting ranges expressed using "to" include numerical values before and after "to" as the lower limit value and the upper limit value. Numerical values expressed with "more than" or "less than" are not included in the numerical ranges.

1. First Embodiment

First, the process flow of a method for producing reduced iron (shaft furnace operation) according to a first embodiment will be described based on FIG. 1. In the first embodiment, schematically, a heated gas mixture 30 which contains a reducing gas 31 and a nitrogen gas 32 is blown into a shaft furnace 10. The gas mixture 31 contains 90 volume % or more of a hydrogen gas.

In more detail, the method for producing reduced iron according to the first embodiment includes a step of heating the gas mixture 30 containing the reducing gas 31 and the nitrogen gas 32, and a step of blowing the heated gas mixture 30 into the shaft furnace 10. Steps other than these may be the same as those of the conventional shaft furnace operation.

For example, as shown in FIG. 1, the reducing gas 31 and the nitrogen gas 32 are introduced into a heating furnace 50, and the reducing gas 31 and the nitrogen gas 32 are heated together in the heating furnace 50. This makes the reducing gas 31 and the nitrogen gas 32 mixed in the heating furnace 50 to become the gas mixture 30, and the gas mixture 30 is heated up to a predetermined temperature.

As described above, the reducing gas 31 contains 90 volume % or more (volume % with respect to the total volume of the reducing gas 31) of a hydrogen gas. That is, the hydrogen gas concentration of the reducing gas 31 becomes 90 volume % or more. From the viewpoint of iron and steel manufacturing with $CO_2$ zero emission, the hydrogen gas concentration of the reducing gas 31 is preferably as high as possible in a range of 90 volume % or more and preferably 100 volume %. Additionally, as a method for heating the reducing gas, an electric heater is preferably used, and, in a case where the heating is performed by combustion heating, a combustion gas mainly containing hydrogen is preferable.

In a case where the hydrogen gas concentration of the reducing gas 31 becomes 90 volume % or more and less than 100 volume %, the reducing gas 31 may contain a reducing gas other than a hydrogen gas. As such a reducing gas, for example, not only a CO gas but also a hydrocarbon gas and the like are included. The hydrocarbon gas generates a CO gas in the shaft furnace.

The nitrogen gas 32 is an inert gas that is not directly involved in any reduction reactions in the shaft furnace and simply functions as a carrier that carries sensible heat into the shaft furnace 10. Therefore, according to the first embodiment, there is no need to apply a heating load only to the hydrogen gas, which makes it possible to carry out shaft furnace operation at an appropriate blow temperature (predetermined temperature).

The amount of the nitrogen gas 32 added to the reducing gas 31 will be described below in detail, but the effects of the present embodiment (the reduction of the hydrogen gas intensity and the dropping of the blow temperature of the hydrogen gas) can be obtained only by slightly adding the nitrogen gas 32 to the reducing gas 31. On the other hand, when the nitrogen gas 32 is excessively added, the deceleration of the reduction reaction rate of iron oxide due to a decrease in the hydrogen concentration in the gas mixture 30 surpasses the effect of compensating the reduction reaction heat by heat supply from the nitrogen gas 32. In this case, the effects of the present embodiment are saturated. From such a viewpoint, the amount of the nitrogen gas 32 added is preferably 90 volume % or less of the reducing gas 31.

The gas mixture 30 is preferably composed only of the above-described reducing gas 31 and nitrogen gas 32 but may contain a gas other than the reducing gas 31 and the nitrogen gas 32 to an extent that the effects of the present embodiment are not affected.

In the heating furnace 50, the gas mixture 30 is heated up to a predetermined temperature (the temperature of the gas mixture at the time of being blown into the shaft furnace, that is, the blow temperature). The predetermined temperature may be adjusted as appropriate depending on the status or the like of shaft furnace operation, and, as described below, the predetermined temperature can be dropped to be lower than that in a case where the nitrogen gas 32 is not added. This is because the nitrogen gas 32 functions as a carrier of sensible heat. The predetermined temperature is preferably 900° C. or lower. The lower limit value of the predetermined temperature is not particularly limited as long as shaft furnace operation by the first embodiment is possible and may be, for example, approximately 750° C.

The gas mixture 30 is heated up to the predetermined temperature and then blown into the shaft furnace 10. Meanwhile, an iron oxide raw material 20 is charged from the top of the shaft furnace 10. The kind of the iron oxide raw material 20 does not particularly matter and may be the same as in the conventional shaft furnace operation. An example of the iron oxide raw material 20 is iron oxide pellets. The gas mixture 30 blown into the shaft furnace 10 flows up in the shaft furnace 10. The reducing gas 31 in the gas mixture 30 reduces the iron oxide raw material 20 in the shaft furnace 10, whereby the reduced iron 21 is produced. A reduction reaction by the hydrogen gas is an endothermic reaction, but the reduction reaction heat is supplied not only by sensible heat from the reducing gas 31 but also by sensible heat from the nitrogen gas 32. The reduced iron 21 is discharged from the bottom of the shaft furnace 10 and then cooled. On the other hand, a furnace top gas 40 is exhausted from the top of the shaft furnace 10. The furnace top gas 40 contains not only an unreacted hydrogen gas but also water vapor and the nitrogen gas 32.

Figure 2:
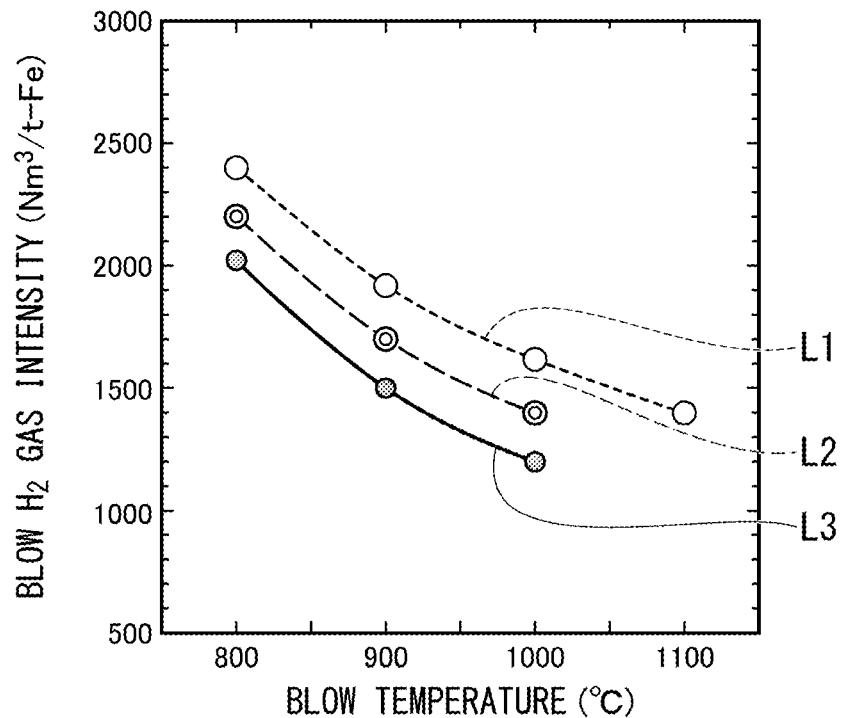
FIG. 2 is a graph showing a relationship between the blow temperature of a gas mixture and a hydrogen gas intensity for each amount of a nitrogen gas added.
Figure 3:
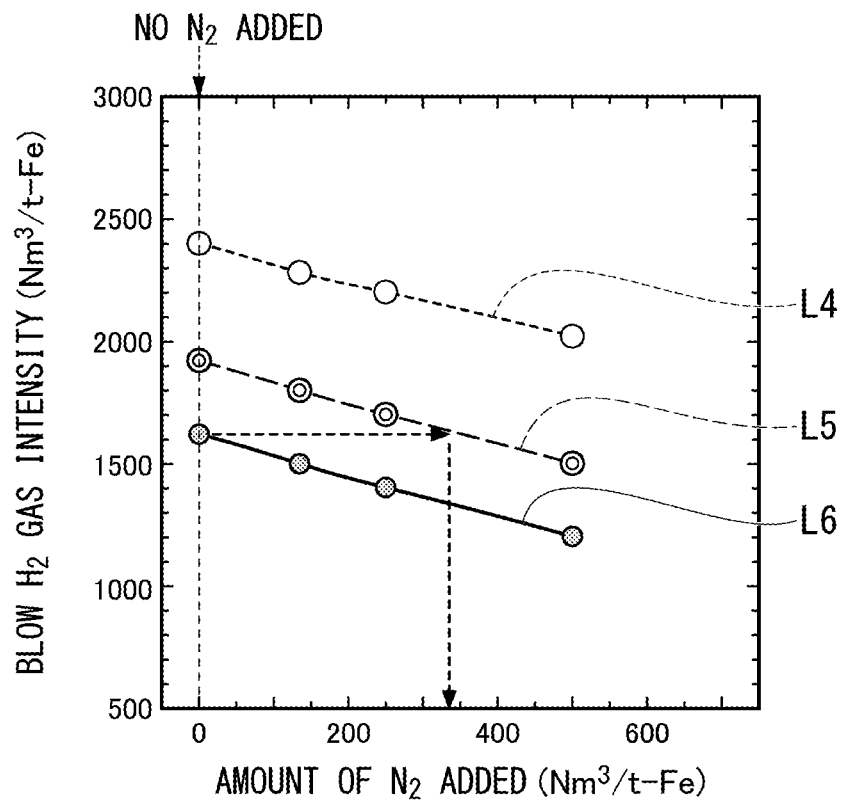
FIG. 3 is a graph showing a relationship between the amount of the nitrogen gas added and the hydrogen gas intensity for each blow temperature of the gas mixture.

Next, effect of the first embodiment will be described. The present inventors simulated the shaft furnace operation according to the first embodiment using the above-described mathematical model. In addition, shaft furnace operation in which the nitrogen gas 32 was not added was also simulated in order for comparison. It should be noted that these simulations correspond to Example and Comparative Example of the first embodiment. The results are shown in FIG. 2 and FIG. 3. The calculation conditions are the same as those in Table 1. In addition, the hydrogen gas concentration of the reducing gas 31 was set to 100 volume %.

Figure 11:
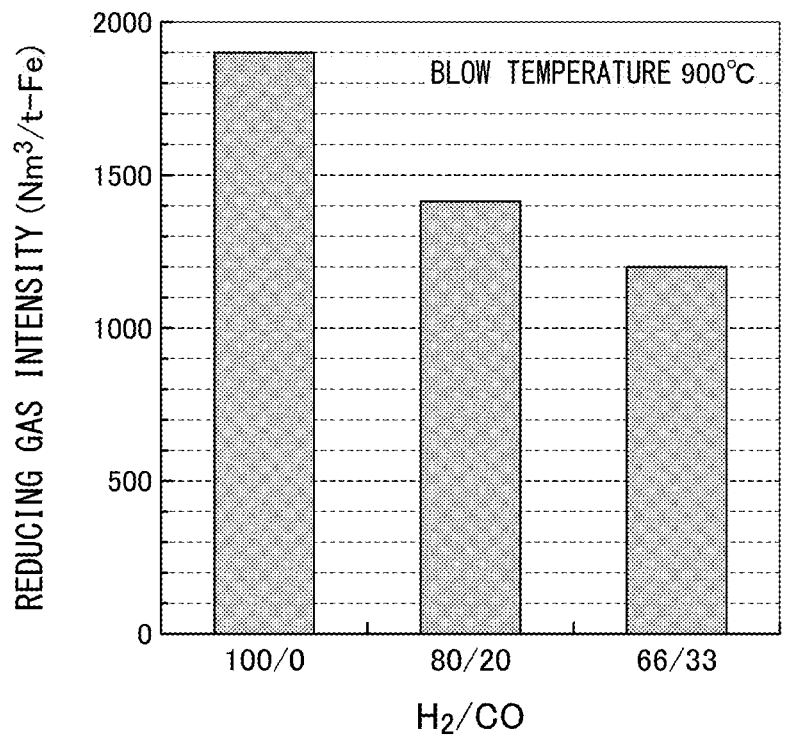
FIG. 11 is a graph showing the trial calculation result of the reducing gas intensity ($Nm^3$/t-Fe) at the time of producing one ton of reduced iron using a reducing gas (900° C.) for each $H_2$/Co volume ratio of the reducing gas.
Figure 12:
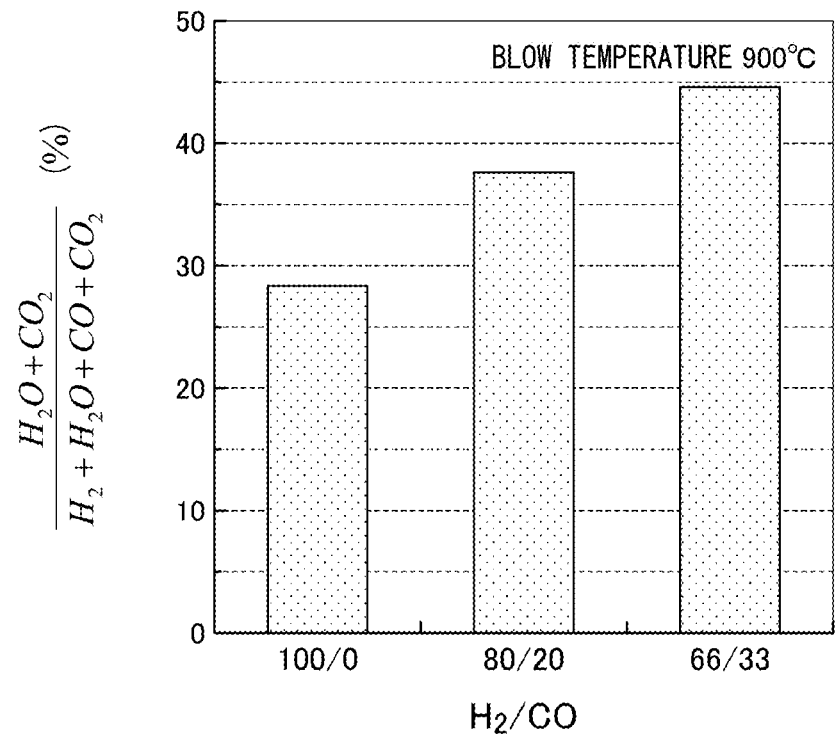
FIG. 12 is a graph showing the utilization ratio (%) of the reducing gas for each $H_2$/Co volume ratio of the reducing gas.
Figure 13:
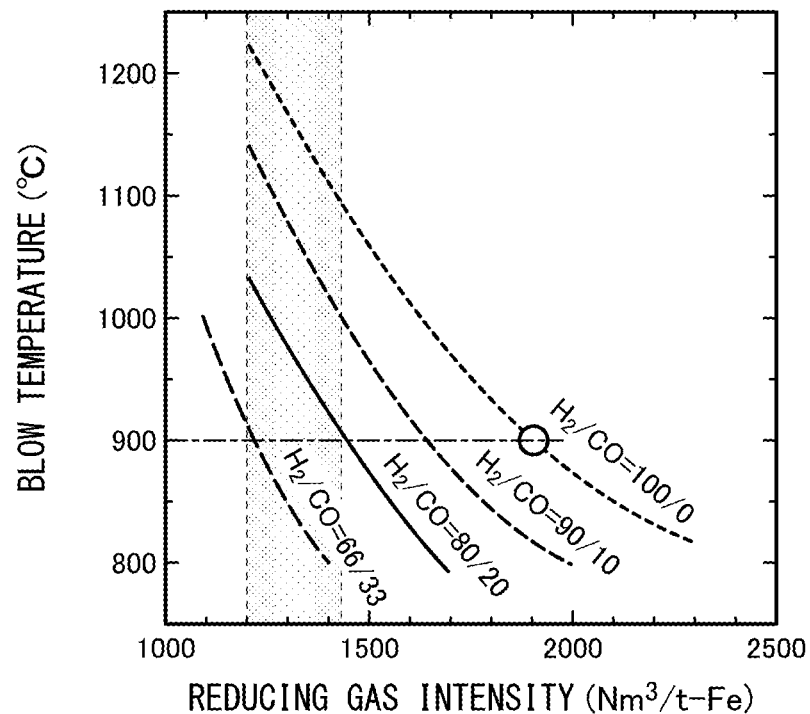
FIG. 13 is a graph showing a relationship between the reducing gas intensity ($Nm^3$/t-Fe) and the blow temperature (° C.) of the reducing gas for each $H_2$/Co volume ratio of the reducing gas.
Figure 14:
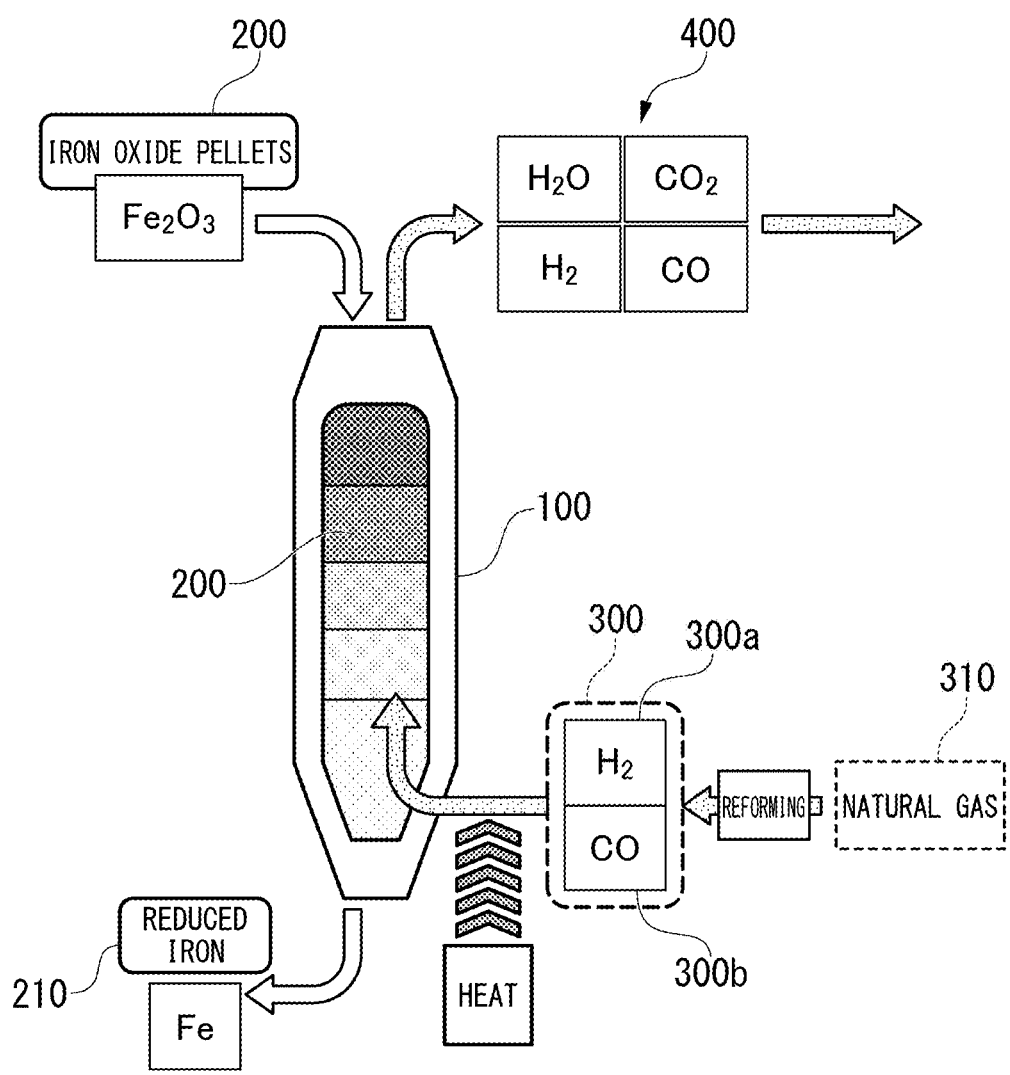
FIG. 14 is an explanatory view showing the process flow of a conventional shaft furnace operation.

FIG. 2 shows the relationship between the blow temperature (° C.) of the gas mixture 30 and the hydrogen gas intensity ($Nm^3$/t-Fe) for each amount of the nitrogen gas 32 added. The graph L1 indicates the above-described relationship when the nitrogen gas is not added, the graph L2 indicates the above-described relationship when 250 $Nm^3$/t-Fe of the nitrogen gas is added to the reducing gas 31 and the graph L3 indicates the above-described relationship when 500 $Nm^3$/t-Fe of the nitrogen gas is added to the reducing gas 31. Therefore, the graphs L2 and L3 correspond to the shaft furnace operation according to the first embodiment. Since the hydrogen gas concentration of the reducing gas 31 is 100 volume %, the hydrogen gas intensity can be read as the reducing gas intensity. According to the graphs L2 and L3 in FIG. 2, when the blow temperature becomes 900° C., the reducing gas intensity becomes approximately 1500 to 1700 $Nm^3$/t-Fe. FIG. 11 shows that, in the conventional shaft furnace operation (the $H_2$/CO volume ratio of the reducing gas is 80/20 to 66/33), when the blow temperature becomes 900° C., the reducing gas intensity becomes approximately 1200 to 1400 $Nm^3$/t-Fe. Therefore, the addition of the nitrogen gas 32 to the reducing gas 31 makes it possible to produce reduced iron on substantially the same blow temperature level (for example, 900° C.) and the same reducing gas intensity level (for example, approximately 1500 to 1700 $Nm^3$/t-Fe) as those in the conventional shaft furnace operation even when the hydrogen gas concentration of the reducing gas 31 is a high concentration (here, 100 volume %).

Therefore, even in a case where a reducing gas containing a high concentration of a hydrogen gas is used, it is possible to reduce the reducing gas intensity and to drop the blow temperature of the gas mixture 30 (that is, the blow temperature of the reducing gas 31). Furthermore, it is also found that, as the amount of the nitrogen gas 32 added increases, the reducing gas intensity decreases, and the blow temperature of the reducing gas 31 also drops. When the blow temperature of the reducing gas 31 drops, for example, sticking or the like is suppressed.

FIG. 3 is a view showing the relationship of FIG. 2 arranged to the relationship between the amount of the nitrogen gas 32 added ($Nm^3$/t-Fe) and the hydrogen gas intensity ($Nm^3$/t-Fe). That is, FIG. 3 shows the relationship between the amount of the nitrogen gas 32 added ($Nm^3$/t-Fe) and the hydrogen gas intensity ($Nm^3$/t-Fe) for each blow temperature (° C.) of the gas mixture 30. The graph L4 indicates the blow temperature becomes 800° C., the graph L5 indicates the above-described relationship when the blow temperature becomes 900° C. and the graph L6 indicates the above-described relationship when the blow temperature becomes 1000° C. According to the graphs L4 to L6, it is found that, in all of the blow temperatures, the hydrogen gas intensity decreases simply by adding a small amount of the nitrogen gas 32.

Furthermore, when attention is paid to the graphs L5 and L6, addition of 330 $Nm^3/t$ of the nitrogen gas to the reducing gas 31 makes it possible to drop the blow temperature of the gas mixture 30 from 1000° C. to 900° C. while maintaining the hydrogen gas intensity. Therefore, addition of the nitrogen gas 32 to the reducing gas 31 makes it possible to drop the blow temperature and, furthermore, to suppress sticking.

Furthermore, when attention is paid to the graph L5 (the blow temperature of 900° C.), addition of 330 $Nm^3/t$-Fe of the nitrogen gas 32 to the reducing gas 31 makes it possible to reduce the hydrogen gas intensity by approximately 300 $Nm^3/t$-Fe. This means that 330 $Nm^3/t$ of the nitrogen gas 32 and 300 $Nm^3/t$-Fe of the hydrogen gas are approximately equivalent to each other from the viewpoint of heat and reaction manipulation. Furthermore, from another angle, the amount of the reduced iron produced can also be controlled by adjusting the amount of the nitrogen gas 32 added under a condition where the blow temperature is constant. For example, when the amount ($Nm^3/t$-Fe) of the nitrogen gas 32 added is increased without changing the blow temperature and the blowing amount of the hydrogen gas per unit time, the amount of the reduced iron produced per unit time increases.

The reason for the fact that the seemingly incomprehensible equivalence relationship is established or the seemingly mysterious operation manipulation is possible is that, in a case where shaft furnace operation is carried out using a reducing gas containing a high concentration of a hydrogen gas, a reduction reaction, the rate of which is controlled by heat supply, occurs (that is, the temperature level in the furnace is appropriately held by the amount of heat that is taken into the shaft furnace 10, so that a reduction reaction smoothly proceeds) in the shaft furnace 10.

As described above, according to the first embodiment, since the gas mixture 30 of the reducing gas 31 and the nitrogen gas 32 is blown into the shaft furnace 10, the nitrogen gas 32 can be used as a carrier of sensible heat. This makes it possible to decrease the reducing gas intensity and makes it possible to drop the blow temperature of the gas mixture 30 even in a case where shaft furnace operation is carried out using the reducing gas 31 containing a high concentration of a hydrogen gas as shown in, for example, FIG. 2 and FIG. 3.

Figure 4:
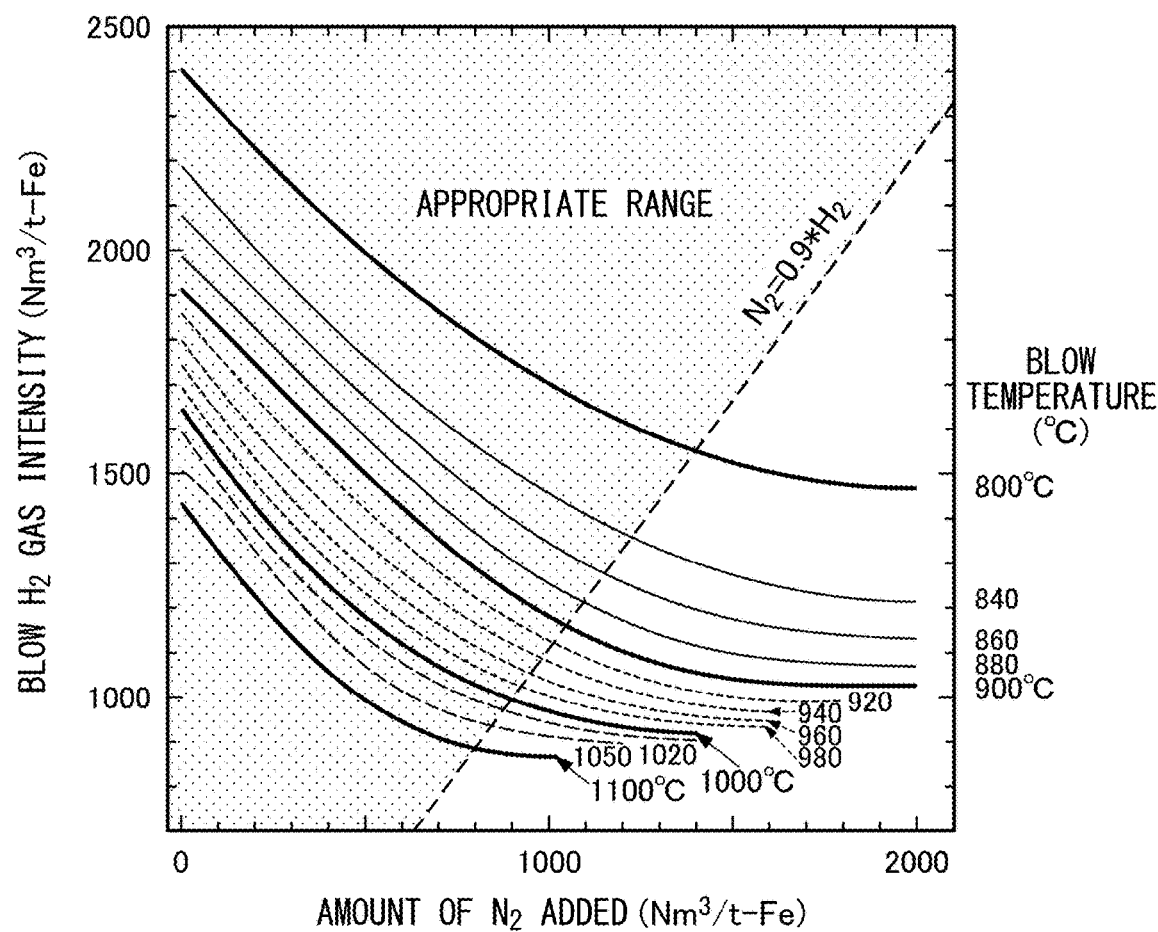
FIG. 4 is a graph showing the relationship between the amount of the nitrogen gas added and the hydrogen gas intensity for each blow temperature of the gas mixture.

The saturation of the effects by the excessive injection of the nitrogen gas 32 will be described based on FIG. 4. The definitions of the vertical axis and horizontal axis of FIG. 4 are the same as those of FIG. 3. However, the horizontal axis of FIG. 4 shows a larger range of the amount of the nitrogen gas added than in FIG. 3. That is, the horizontal axis of FIG. 4 is an extended version of the horizontal axis of FIG. 3. The graphs drawn in FIG. 4 are the same as the graphs L4 to L6 in FIG. 3. The blow temperatures of these graphs are 800° C., 840° C., 860° C., 880° C., 900° C., 920° C., 940° C., 960° C., 980° C., 1000° C., 1020° C., 1050° C. and 1100° C. from above.

As shown in FIG. 4 and described in the above paragraph, when the nitrogen gas 32 is excessively added to the reducing gas 31, the effects of the present embodiment are saturated. Conditions under which the effects are saturated vary with the condition of the blow temperature, but it can be said that the effects of the present embodiment can be taken advantage of when a condition under which the volume flow rate (amount added) of the nitrogen gas 32 is set to approximately 90 volume % or less of the volume flow rate of the reducing gas 31 (that is, a condition under which the gas mixture 30 contains the nitrogen gas 32 at a proportion of 90 volume % or less of the reducing gas 31) is satisfied.

1-1. First Modification Example

Figure 5:
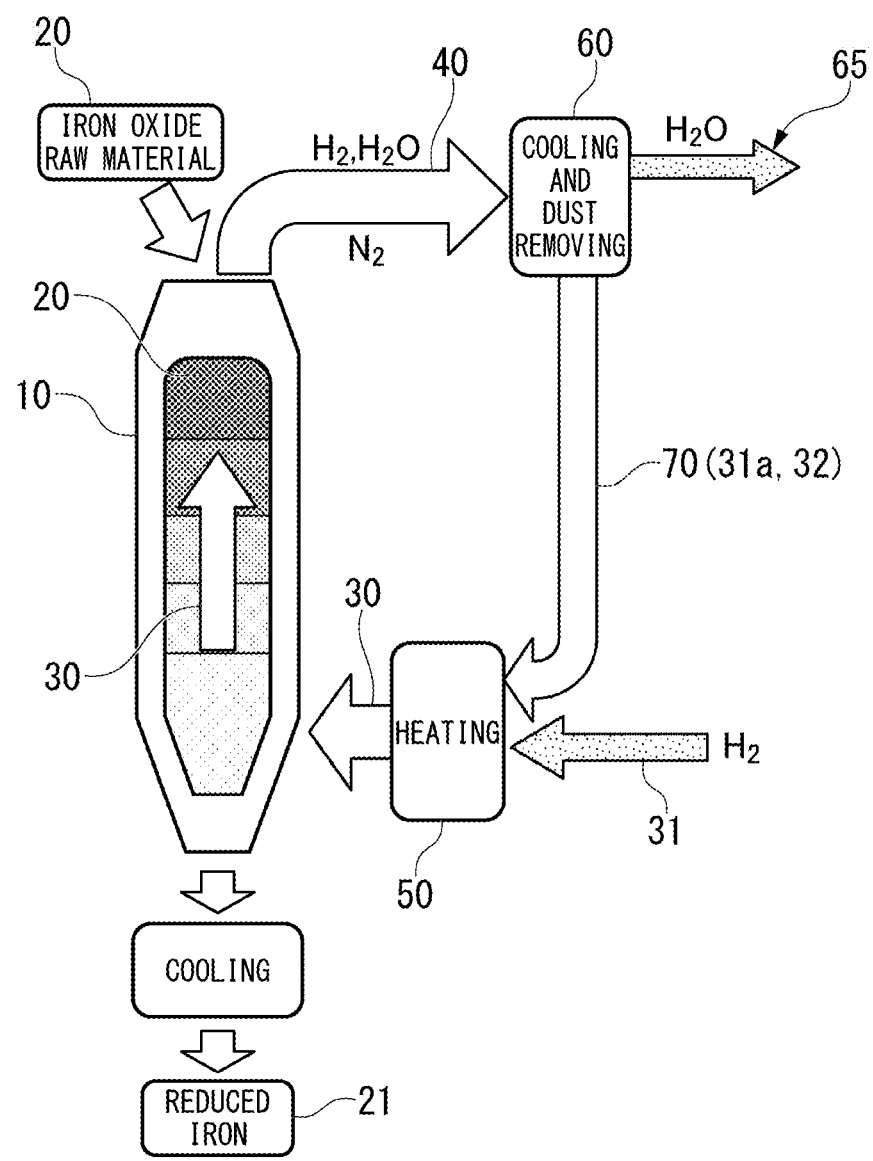
FIG. 5 is an explanatory view showing the process flow of a method for producing reduced iron according to a first modification example of the first embodiment.

Next, a first modification example of the first embodiment will be described based on FIG. 5. In actual shaft furnace operation, it is also important to effectively use the reducing gas 31 and the nitrogen gas 32. Therefore, in the first modification example, an unreacted hydrogen gas 31a and the nitrogen gas 32 are separated and collected from the furnace top gas 40 and reused as part of the gas mixture 30.

Specifically, the furnace top gas 40 is introduced into a separation and collection device 60, and the furnace top gas 40 is cooled in the separation and collection device 60. Furthermore, it is preferable to remove dust from the furnace top gas 40. This removes water vapor from the furnace top gas 40 as water 65 and separates and collects the unreacted hydrogen gas 31a and the nitrogen gas 32 as a circulation gas 70. In a case where the reducing gas 31 contains a reducing gas other than a hydrogen gas (CO or the like), the circulation gas 70 may contain not only the reducing gas that is unreacted but also an oxide of the reducing gas ($CO_2$ or the like), and there is no problem with operation even when the circulation gas 70 contains these gases. As the separation and collection device 60, it is possible to use, for example, a device or the like that separates and collects an unreacted reducing gas from a furnace top gas of a blast furnace. In addition, the circulation gas 70 is reused as part of the gas mixture 30. That is, the circulation gas 70 is, again, introduced into the heating furnace 50 and heated.

As described above, the nitrogen gas 32 functions as a carrier that carries sensible heat into the shaft furnace 10 and is thus not consumed in the shaft furnace 10. Therefore, the nitrogen gas 32 circulates in a circulation system that couples the heating furnace 50, the shaft furnace 10 and the separation and collection device 60. Therefore, once a necessary amount of the nitrogen gas 32 for the production of a desired amount of reduced iron is introduced into this circulation system, theoretically, there is no need to introduce the nitrogen gas 32 from the outside afterwards. The nitrogen gas 32 may be further supplied from the outside.

On the other hand, since the reducing gas 31 is consumed in the shaft furnace 10, only the circulated hydrogen gas 31a cannot make the reducing gas 31 sufficient. Therefore, the reducing gas 31 is supplied from the outside for compensating the insufficiency. Theoretically, this makes it possible to produce the reduced iron 21 with the stoichiometrically minimum amount of the reducing gas 31. The reducing gas 31 may be supplied from the outside more than the stoichiometric amount.

As described above, according to the first modification example, it is possible to effectively use the reducing gas 31 and the nitrogen gas 32.

1-2. Second Modification Example

Figure 6:
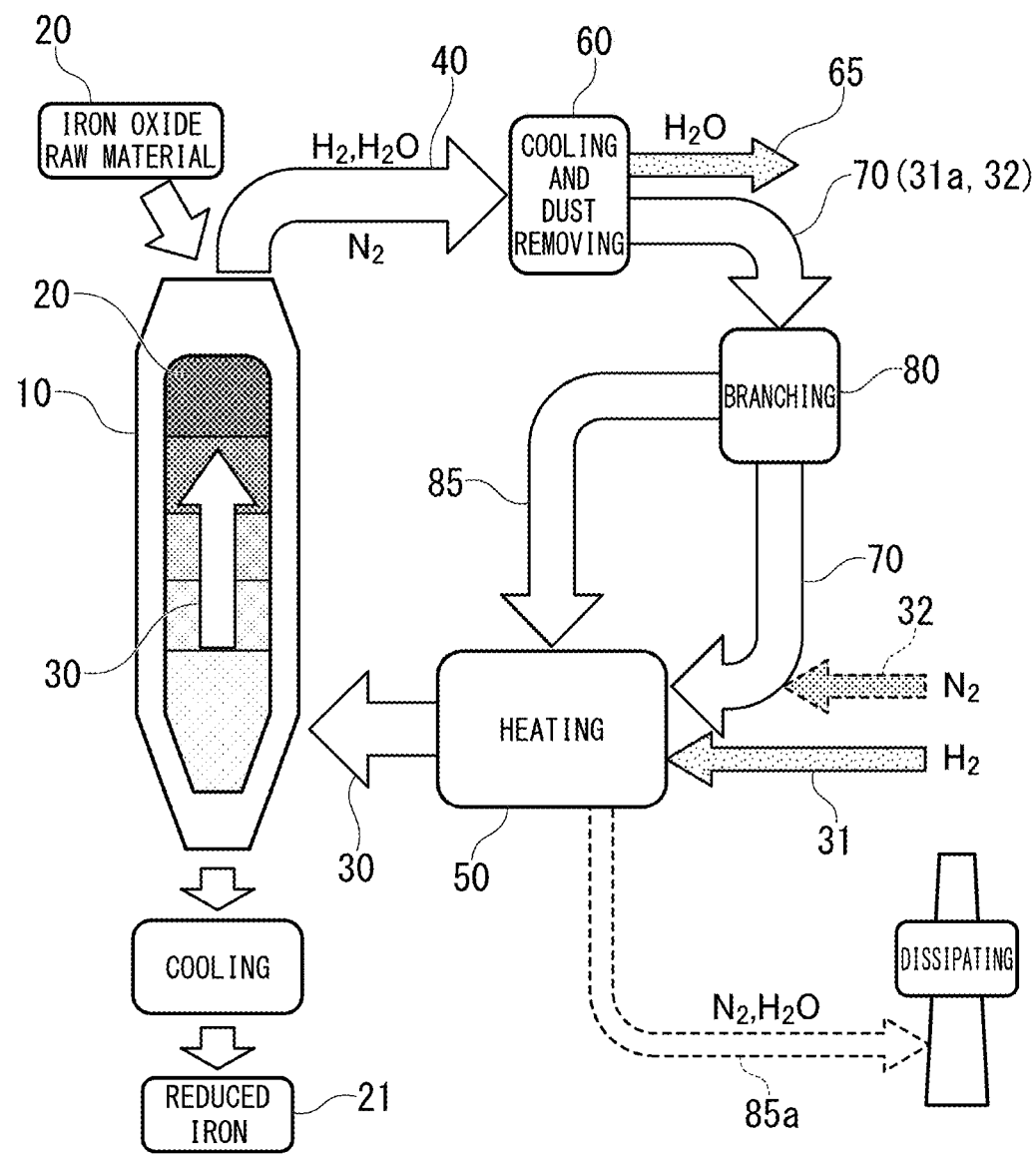
FIG. 6 is an explanatory view showing the process flow of a method for producing reduced iron according to a second modification example of the first embodiment.

Next, a second modification example of the first embodiment will be described based on FIG. 6. In the second modification example, as same as the first modification example, the unreacted hydrogen gas 31a and the nitrogen gas 32 are separated and collected from the furnace top gas 40 and reused as part of the gas mixture 30. In the second modification example, while performing the treatments similar to the first modification example, it is possible to control the amount of the nitrogen gas 32 circulating in the circulation system.

More specifically, in the second modification example, the circulation gas 70 separated and collected with the separation and collection device 60 is introduced into a branching pipe 80. In the branching pipe 80, part of the circulation gas 70 is supplied to the heating furnace 50 as a fuel gas 85 in the heating furnace 50. The heating furnace 50 generates heat by combusting the fuel gas 85 and heats the gases in the heating furnace 50 with this heat. A combusted exhaust gas 85a (containing water vapor and the nitrogen gas 32) is dissipated to the outside. The rest of the circulation gas 70 is, as same as the first modification example, reused as part of the gas mixture 30. That is, the circulation gas 70 is, again, introduced into the heating furnace 50. Other treatments are the same as those in the first modification example. If the nitrogen gas 32 is not introduced from the outside, the nitrogen gas 32 that circulates in a circulation system (the circulation system in which the circulation gas 70 circulates) gradually decrease. On the other hand, by introducing the nitrogen gas 32 from the outside, it is possible to maintain or increase the amount of the nitrogen gas 32 that circulates in the circulation system.

As explained above, according to the second modification example, it is possible to effectively use the reducing gas 31 and the nitrogen gas 32, and to control the amount of the nitrogen gas 32 which circulates in the circulation system.

2. Second Embodiment

Next, the process flow of a method for producing reduced iron (shaft furnace operation) according to a second embodiment will be described based on the FIG. 7. In the second embodiment, as similar to the first embodiment, a gas mixture 30 which contains a reducing gas 31 and a nitrogen gas 32, the reducing gas 31 containing 90 volume % or more of a hydrogen gas, and which has a certain temperature, is blown into a shaft furnace 100. However, the method for producing reduced iron according to the second embodiment differs from the first embodiment in the point that the reducing gas 31 and the nitrogen gas 32 are separately heated and thereafter mixed.

More specifically, the method for producing reduced iron according to the second embodiment includes: a step of separately heating the reducing gas 31 and the nitrogen gas 32, a step of mixing the heated reducing gas 31 and the heated nitrogen gas 32 to prepare a gas mixture 30 having a predetermined temperature, and a step of blowing the gas mixture 30 having a predetermined temperature into the shaft furnace 10. Other steps may be the same as those employed in the conventional shaft furnace operation.

Figure 7:
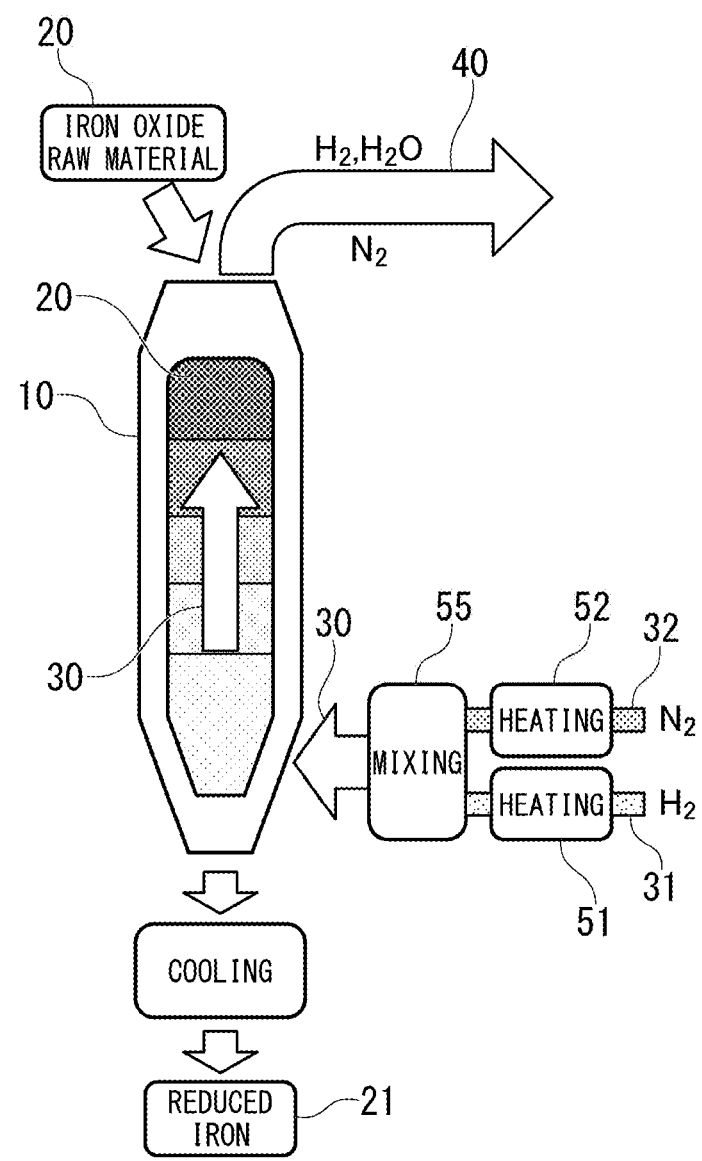
FIG. 7 is an explanatory view showing the process flow of a method for producing reduced iron according to a second embodiment.

For example, as shown in FIG. 7, the reducing gas 31 is introduced into a reducing gas heating furnace 51 and then is heated, and the nitrogen gas 32 is introduced into a nitrogen gas heating furnace 52 and then is heated. This makes it possible to separately heat the reducing gas 31 and the nitrogen gas 32. The properties of the reducing gas 31 and the nitrogen gas 32 are the same as those explained in the first embodiment. For example, the reducing gas 31 contains the hydrogen gas by 90 volume % or more (volume % with respect to the total volume of the reducing gas 31). That is, the hydrogen gas concentration of the reducing gas 31 is 90 volume % or more. Within a range of 90 volume % or more, it is preferable that the hydrogen gas concentration of the reducing gas 31 is high, and it is preferable that the hydrogen gas concentration of the reducing gas 31 is 100 volume %. If the hydrogen gas concentration of the reducing gas 31 is within a range of 90 volume % or more and less than 100 volume %, the reducing gas 31 may contain a reducing gas other than the hydrogen gas. An example of this reducing gas is not only CO gas, but also a hydrocarbon gas and the like. The gas mixture 30 is preferably composed only of the above-described reducing gas 31 and nitrogen gas 32, but may contain a gas other than the reducing gas 31 and the nitrogen gas 32 to an extent that the effects of the present embodiment are not affected.

Then, the heated reducing gas 31 and the heated nitrogen gas 32 are mixed at a mixing part 55 (for example, at a junction of a pipe of the reducing gas 31 and a pipe of the nitrogen gas 32). In other words, the heated nitrogen gas 32 is added to the heated reducing gas 31. This makes it possible to prepare the gas mixture 30 having a predetermined temperature. Then, the gas mixture 30 is blown into the shaft furnace 10. Steps performed thereafter are the same as those of the first embodiment. Therefore, the heating temperature of the reducing gas 31 and the heating temperature of the nitrogen gas 32 are controlled such that the temperature of the gas mixture 30 after the mixing step becomes the predetermined temperature. As described above, the predetermined temperature is preferably 900° C. or lower. The lower limit value of the predetermined temperature is not particularly limited as long as shaft furnace operation by the second embodiment is possible and may be, for example, approximately 750° C.

The heating temperature of the reducing gas 31 and the heating temperature of the nitrogen gas 32 are not particularly limited if the temperature of the gas mixture 30 is within a range of the predetermined temperature, but it is preferable that the heating temperature of the nitrogen gas 32 is set higher than the heating temperature of the reducing gas 31. In this case, it is possible to drop the heating temperature of the reducing gas 31, and thus further reduce a heating load applied to the reducing gas 31. As described in the first embodiment, when the amount of the nitrogen gas 32 added is large, the blow temperature of the gas mixture 30 (that is, the predetermined temperature) can be dropped. Therefore, if the amount of the nitrogen gas 32 added is large, a heating load applied to the reducing gas 31 can be further reduced. In addition, as will be described below in detail, if the amount of the nitrogen gas 32 added is large, the dropped amount of the heating temperature of the reducing gas 31 increases with respect to the increase amount of the heating temperature of the nitrogen gas 32. That is, if the amount of the nitrogen gas 32 added is large, it is possible to significantly drop the heating temperature of the reducing gas 31 by only slightly increasing the heating temperature of the nitrogen gas 32. Thus, if the amount of the nitrogen gas 32 added is large, the effect of separate heating becomes significant. It should be noted that, as explained in the first embodiment, it is preferable that the amount of the nitrogen gas 32 added is 90 volume % or less with respect to the total volume of the reducing gas 31.

Figure 8:
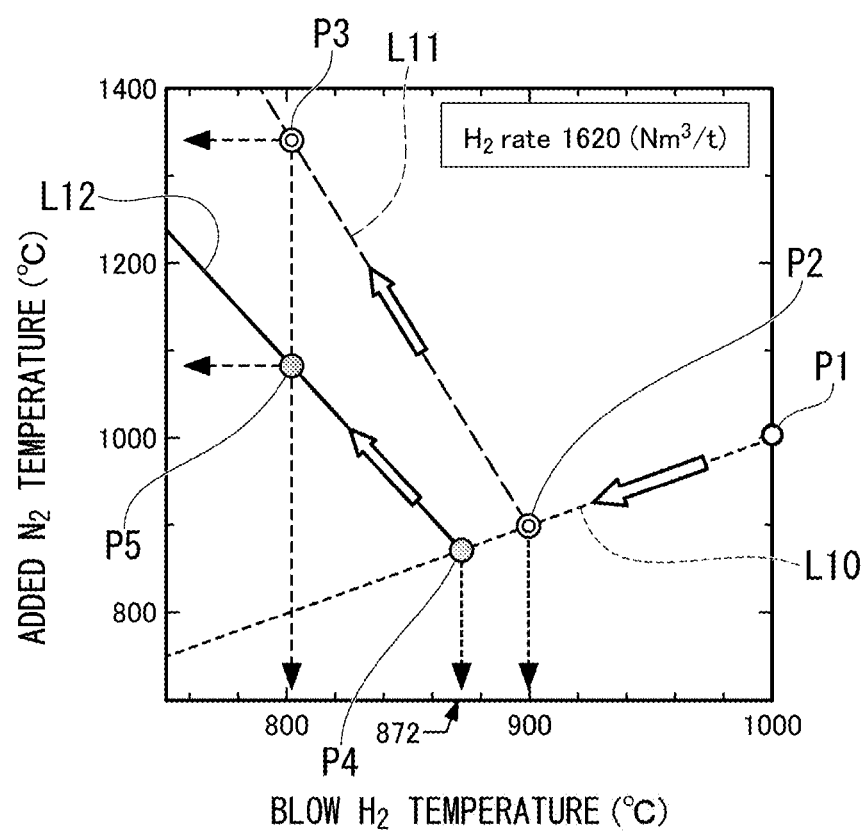
FIG. 8 is a graph showing a relationship between the heating temperature (° C.) of a hydrogen gas and the heating temperature (° C.) of a nitrogen gas.

Next, effects obtained by the second embodiment will be explained. Present inventors simulated a shaft furnace operation according to the second embodiment using the above-described mathematical model. In addition, for the purpose of comparison, present inventors simulated a shaft furnace operation which is the same as the first embodiment, and a shaft furnace operation in which the nitrogen gas 32 is not added. These simulations correspond to Example and Comparative Examples. FIG. 8 shows the results. The calculation conditions are the same as those shown in Table 1. The hydrogen gas concentration of the reducing gas 31 was 100 volume %.

FIG. 8 is a graph showing a relationship between the heating temperature of the hydrogen gas (that is, the heating temperature of the reducing gas 31) (° C.) and the heating temperature of the nitrogen gas (° C.). In FIG. 8, the hydrogen gas intensity (the reducing gas intensity) is a constant value of 1620 Nm$^3$/t-Fe. The graph L10 represents this relationship in a case that the reducing gas 31 and the nitrogen gas 32 are mixed and then heated (that is, the heating treatment which is the same as the treatment in the first embodiment). As the hydrogen gas intensity is constant, in each point in the graph L10, the amounts of the nitrogen gas 32 added are different respectively (see FIG. 2 and FIG. 3). At the point P1 on the graph L10, the amount of the nitrogen gas added is zero. The graph L11 and the graph L12 show relationship between the heating temperature of the hydrogen gas when the reducing gas 31 and the nitrogen gas 32 are separately heated (that is, the heating temperature of the reducing gas 31) (° C.), and the heating temperature of the nitrogen gas (° C.). It should be noted that, in the graph L11, the amount of the nitrogen gas 32 added is 330 Nm$^3$/t-Fe, and in the graph L12, the amount of the nitrogen gas 32 added is 500 Nm$^3$/t-Fe.

If the hydrogen gas intensity is 1620 Nm$^3$/t-Fe, and the amount of the nitrogen gas 32 added is 330 Nm$^3$/t-Fe, as shown in FIG. 3, the blow temperature of the gas mixture 30 becomes approximately 900° C. Therefore, in a case that the reducing gas 31 and the nitrogen gas 32 are mixed and then heated, the heating temperature of the reducing gas 31 and the nitrogen gas 32 becomes 900° C., as same as the blow temperature of the gas mixture 30 (point P2).

If the hydrogen gas intensity is 1620 Nm$^3$/t-Fe, and the amount of the nitrogen gas 32 added is 500 Nm$^3$/t-Fe, as shown in FIG. 3, the blow temperature of the gas mixture 30 becomes 900° C. or lower (the calculated value by the mathematical model is 872° C.). Therefore, in a case that the reducing gas 31 and the nitrogen gas 32 are mixed and then heated, the heating temperature of the reducing gas 31 and the nitrogen gas 32 becomes 872° C., as same as the blow temperature of the gas mixture 30 (point P4).

Therefore, considering a case in which 100 volume % hydrogen gas is blown into the shaft furnace 10 at the blow temperature 1000° C. as a starting point (point P1), by setting the amount of the nitrogen gas 32 added to be 330 Nm$^3$/t-Fe, without increasing the hydrogen gas intensity, it is possible to drop the blow temperature of the gas mixture 30 to 900° C. (point P2). Further, as shown in the graph L11, by separately heating the reducing gas 31 and the nitrogen gas 32 and increasing the heating temperature of the nitrogen gas 32 to be approximately 1350° C., it is possible to drop the heating temperature of the reducing gas 31 to be approximately 800° C. (point P3).

Further, by setting the amount of the nitrogen gas 32 added to be 500 Nm$^3$/t-Fe, without increasing the hydrogen gas intensity, it is possible to drop the blow temperature of the gas mixture 30 to be 872° C., which is not higher than 900° C. (point P4). Further, as shown in the graph L12, by separately heating the reducing gas 31 and the nitrogen gas 32 and increasing the heating temperature of the nitrogen gas 32 to be approximately 1080° C., it is possible to drop the heating temperature of the reducing gas 31 to be approximately 800° C. (point P5).

Further, comparing the graph L11 and the graph L12, the slope in the graph L12 is smaller than the slope in the graph L11. This indicates that when the amount of the nitrogen gas 32 added is large, the dropped amount of the heating temperature of the reducing gas 31 increases with respect to the increased amount of the heating temperature of the nitrogen gas 32.

As explained above, according to the second embodiment, the reducing gas 31 and the nitrogen gas 32 are separately heated, therefore, it is possible to further reduce a heating load applied to the reducing gas 31. This effect obtained by the separate heating becomes strong when the heating temperature of the nitrogen gas 32 is set higher than the heating temperature of the reducing gas 31. Further, this effect obtained by the separate heating becomes strong when the amount of the nitrogen gas 32 added is large.

2-1. Modification Example

Figure 9:
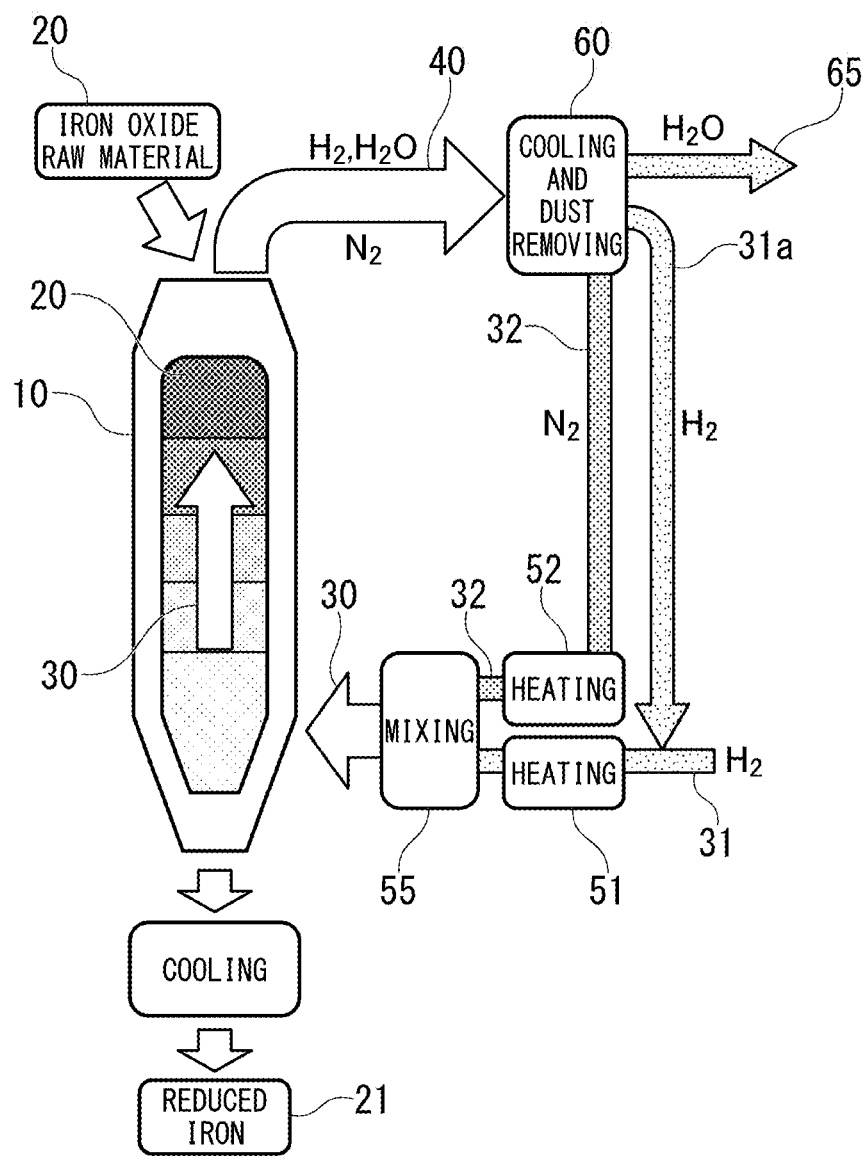
FIG. 9 is an explanatory view showing the process flow of a method for producing reduced iron according to a modification example of the second embodiment.
Figure 10:
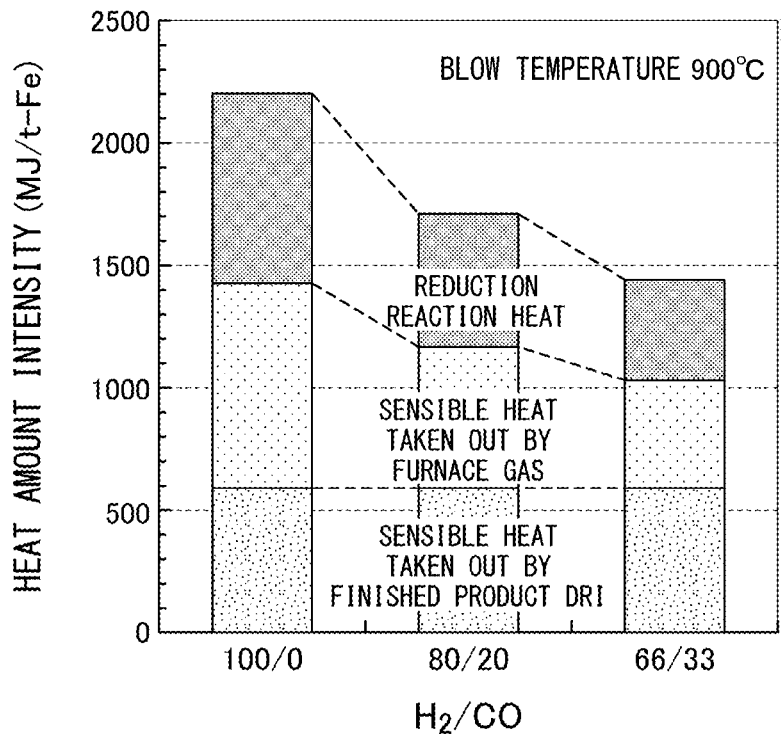
FIG. 10 is a graph showing the trial calculation result of the heat amount intensity (MJ/t-Fe) at the time of producing one ton of reduced iron using a reducing gas (900° C.) for each $H_2$/Co volume ratio of the reducing gas.

Next, a modification example of the second embodiment will be described based on FIG. 9. Schematically, this modification example applies the first modification example of the first embodiment to the second embodiment. That is, in this modification example, from the furnace top gas 40, the unreacted hydrogen gas 31a and the nitrogen gas 32 are respectively separated and collected and are reused as the reducing gas 31 and the nitrogen gas 32 to be heated.

Specifically, the furnace top gas 40 is introduced into a separation and collection device 60, and the furnace top gas 40 is cooled in the separation and collection device 60. Furthermore, it is preferable to remove dust from the furnace top gas 40. This removes water vapor from the furnace top gas 40 as water 65 and separates and collects the unreacted hydrogen gas 31a and the nitrogen gas 32. Then, the gas separated and collected forms a gas mixture of the unreacted hydrogen gas 31a and the nitrogen gas 32, thus, to this gas mixture, hydrogen gas separating treatment, or nitrogen gas separating treatment is performed. By this treatment, the unreacted hydrogen gas 31a and the nitrogen gas 32 are respectively separated and collected. As the hydrogen gas separating treatment and the nitrogen gas separating treatment, for example, Pressure Swing Adsorption method (PSA method) (https://www.jstage.jst.go.jp/article/jvsj1958/43/12/43_12_1088/_pdf) may be used. The unreacted hydrogen gas 31a separated and collected is introduced into the reducing gas heating furnace 51, and the nitrogen gas 32 separated and collected is introduced into the nitrogen gas heating furnace 52. This makes it possible to reuse the unreacted hydrogen gas 31a and the nitrogen gas 32.

As same as the first modification example of the first embodiment, the nitrogen gas 32 is not consumed in the circulation system (in this case, the circulation system that couples the nitrogen gas heating furnace 52, the shaft furnace 10, and the separation and collection device 60). Therefore, once a necessary amount of the nitrogen gas 32 for the production of a desired amount of reduced iron is introduced into this circulation system, theoretically, there is no need to introduce the nitrogen gas 32 from the outside afterwards. On the other hand, since the reducing gas 31 is consumed in the shaft furnace, only the circulated hydrogen gas 31a cannot make the reducing gas 31 sufficient. Therefore, the reducing gas 31 is supplied from the outside for compensating the insufficiency.

As explained above, according to this modification example, it is possible to effectively use the reducing gas 31 and the nitrogen gas 32.

Hitherto, the preferred embodiments of the present disclosure have been described in detail with reference to the accompanying drawings, but the present disclosure is not limited to such examples. It is evident that a person skilled in the art of the present disclosure is able to consider a variety of modification examples or correction examples within the scope of the technical concept described in the claims, and such examples are understood to be in the technical scope of the present disclosure.

BRIEF DESCRIPTION OF THE REFERENCE SYMBOLS

10 Shaft furnace
20 Iron oxide raw material
30 Gas mixture
31 Reducing gas
32 Nitrogen gas
40 Furnace top gas
50 Heating furnace
60 Separation and collection device
70 Circulation gas
80 Branching pipe
85 Fuel gas

The invention claimed is:

1. A method for producing reduced iron that produces reduced iron by reducing iron oxide charged in a shaft furnace, the method comprising:
   wherein a heated gas mixture which contains a reducing gas and a nitrogen gas is blown into the shaft furnace, the reducing gas containing 90 volume % or more of a hydrogen gas, and
   wherein, without changing a blow temperature and a blow amount of the hydrogen gas per unit time, the amount of the reduced iron produced per unit time is increased by increasing the amount of the nitrogen gas added.

2. A method for producing reduced iron that produces reduced iron by reducing iron oxide charged in a shaft furnace, the method comprising:
   heating a gas mixture which contains a reducing gas and a nitrogen gas, the reducing gas containing 90 volume % or more of a hydrogen gas, and
   blowing the heated gas mixture into the shaft furnace, and
   wherein, without changing a blow temperature and a blow amount of the hydrogen gas per unit time, the amount of the reduced iron produced per unit time is increased by increasing the amount of the nitrogen gas added.

3. The method for producing reduced iron according to claim 2, the method comprising:
   separating and collecting at least unreacted hydrogen gas and nitrogen gas from a furnace top gas of the shaft furnace; and
   reusing the separated and collected hydrogen gas and nitrogen gas as part of the gas mixture.

4. The method for producing reduced iron according to claim 3, the method comprising:
   using part of the separated and collected hydrogen gas and nitrogen gas as a fuel gas at a time of heating the gas mixture.

5. A method for producing reduced iron that produces reduced iron by reducing iron oxide charged in a shaft furnace, the method comprising:
   separately heating a reducing gas and a nitrogen gas, the reducing gas containing 90 volume % or more of a hydrogen gas,
   mixing the heated reducing gas and the heated nitrogen gas to prepare a gas mixture, and
   blowing the gas mixture into the shaft furnace.

6. The method for producing reduced iron according to claim 5,
   wherein a heating temperature of the nitrogen gas is higher than a heating temperature of the reducing gas.

7. The method for producing reduced iron according to claim 5, the method comprising:
   separating and collecting at least unreacted hydrogen gas and nitrogen gas from a furnace top gas of the shaft furnace; and
   reusing the separated and collected hydrogen gas and nitrogen gas as the reducing gas and the nitrogen gas to be heated.

8. The method for producing reduced iron according to claim 1,
   wherein, in the gas mixture, a proportion of the nitrogen gas is 90 volume % or less of the reducing gas.

9. The method for producing reduced iron according to claim 1,
   wherein, at a time of blowing the gas mixture into the shaft furnace, a temperature of the gas mixture is 900° C. or lower.

10. The method for producing reduced iron according to claim 2,
    wherein, in the gas mixture, a proportion of the nitrogen gas is 90 volume % or less of the reducing gas.

11. The method for producing reduced iron according to claim 2,
    wherein, at a time of blowing the gas mixture into the shaft furnace, a temperature of the gas mixture is 900° C. or lower.

12. The method for producing reduced iron according to claim 5,
    wherein, in the gas mixture, a proportion of the nitrogen gas is 90 volume % or less of the reducing gas.

13. The method for producing reduced iron according to claim 5,
    wherein, at a time of blowing the gas mixture into the shaft furnace, a temperature of the gas mixture is 900° C. or lower.

14. The method for producing reduced iron according to claim 5,
    wherein, without changing a blow temperature and a blow amount of the hydrogen gas per unit time, the amount of the reduced iron produced per unit time is increased by increasing the amount of the nitrogen gas added.

* * * * *